United States Patent
Takeno

(12)
(10) Patent No.: US 11,763,592 B2
(45) Date of Patent: *Sep. 19, 2023

(54) VIDEO PROCESSING DEVICE

(71) Applicant: TOSHIBA TEC KABUSHIKI KAISHA, Tokyo (JP)

(72) Inventor: Yuishi Takeno, Numazu Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 97 days.

This patent is subject to a terminal disclaimer.

(21) Appl. No.: 17/151,212

(22) Filed: Jan. 18, 2021

(65) Prior Publication Data
US 2021/0295040 A1     Sep. 23, 2021

(30) Foreign Application Priority Data

Mar. 18, 2020    (JP) ................................ 2020-047813

(51) Int. Cl.
| | | |
|---|---|---|
| *G06V 40/10* | (2022.01) | |
| *G06V 20/00* | (2022.01) | |
| *G06V 20/40* | (2022.01) | |

(52) U.S. Cl.
CPC .......... *G06V 40/107* (2022.01); *G06V 20/00* (2022.01); *G06V 20/40* (2022.01)

(58) Field of Classification Search
CPC ...... G06V 20/00; G06V 40/107; G06V 20/40; H04N 7/18; G08B 7/06; G08B 21/24
See application file for complete search history.

(56) References Cited

U.S. PATENT DOCUMENTS

| | | | | |
|---|---|---|---|---|
| 2011/0050875 A1* | 3/2011 | Nagata | ............. | G08B 13/19613 |
| | | | | 382/218 |
| 2012/0146789 A1* | 6/2012 | De Luca | ................ | G06V 20/52 |
| | | | | 382/103 |
| 2013/0226643 A1* | 8/2013 | Sakaue | .......... | G06Q 10/063114 |
| | | | | 705/7.15 |
| 2014/0241571 A1* | 8/2014 | Bilet | .................... | G06T 7/0004 |
| | | | | 382/103 |
| 2019/0012794 A1* | 1/2019 | Radwin | ..................... | G06T 7/75 |
| 2020/0098102 A1* | 3/2020 | Kotake | ..................... | G06T 7/70 |
| 2021/0279657 A1* | 9/2021 | Golden | ................. | G01D 21/02 |
| 2021/0304104 A1* | 9/2021 | Okamura | .............. | G06V 40/20 |
| 2022/0019802 A1* | 1/2022 | Nassar | ................. | G06K 9/6201 |

FOREIGN PATENT DOCUMENTS

JP        2013-174980 A    9/2013

\* cited by examiner

*Primary Examiner* — Nimesh Patel
(74) *Attorney, Agent, or Firm* — Kim & Stewart LLP

(57) ABSTRACT

An image processing device includes a camera interface connectable to a camera configured to capture a video of a worker in a work area, an output interface connectable to a display device that is viewable from the work area, a memory that stores task information about a task to be performed by the worker, and a processor configured to determine a position and a posture of the worker in the work area based on the captured video, determine whether the worker has performed the task properly based on the task information stored in the memory and the determined position and posture of the worker, upon determining that the worker has not performed the task properly, extract from the video a first part showing the task that has been performed by the worker, and control the output interface to output the first part to the display device.

20 Claims, 5 Drawing Sheets

VIDEO PROCESSING DEVICE

CROSS-REFERENCE TO RELATED APPLICATIONS

This application is based upon and claims the benefit of priority from Japanese Patent Application No. 2020-047813, filed on Mar. 18, 2020, the entire contents of which are incorporated herein by reference.

FIELD

Embodiments described herein relate generally to a video processing device.

BACKGROUND

Conventionally, in a distribution center, a warehouse, a store, or the like, a worker will take out a designated item, article, or commodity from a shelf and then pack it in a storage container, such as a box or the like, for shipping or transport. However, mispackaging of items sometime happens, and it is difficult to completely eliminate such human errors. For example, in a distribution center, a warehouse, a large store, or the like, the number of packaging operations is often so great that it is difficult to entirely eliminate packing errors even if operators carefully perform their operations.

There is also a conventional monitoring system that is known in which a camera continuously captures and records video of workers and their operations. In such a monitoring system, when an error is somehow discovered in a work result or the like, the recorded images (video) can be reviewed. However, with such a conventional, post-error review-based system, the monitoring system cannot function to immediately notify a worker when an error has been made, and thus the worker cannot correct the error as it happens (or shortly thereafter). Therefore, a mispacked storage container might be shipped or the like.

DETAILED DESCRIPTION

In general, according to one embodiment, an image processing device includes a camera interface connectable to a camera configured to capture a video of a worker in a work area, an output interface connectable to a display device that is viewable from the work area, a memory that stores task information about a task to be performed by the worker, and a processor. The processor is configured to read the captured video and determine a position and a posture of the worker in the work area, determine whether the worker has performed the task properly based on the task information stored in the memory and the determined position and posture of the worker, upon determining that the worker has not performed the task properly, extract from the video a first part showing the task that has been performed by the worker, and control the output interface to output the first part to the display device.

Hereinafter, one or more example embodiments will be described with reference to the drawings.

Figure 1:
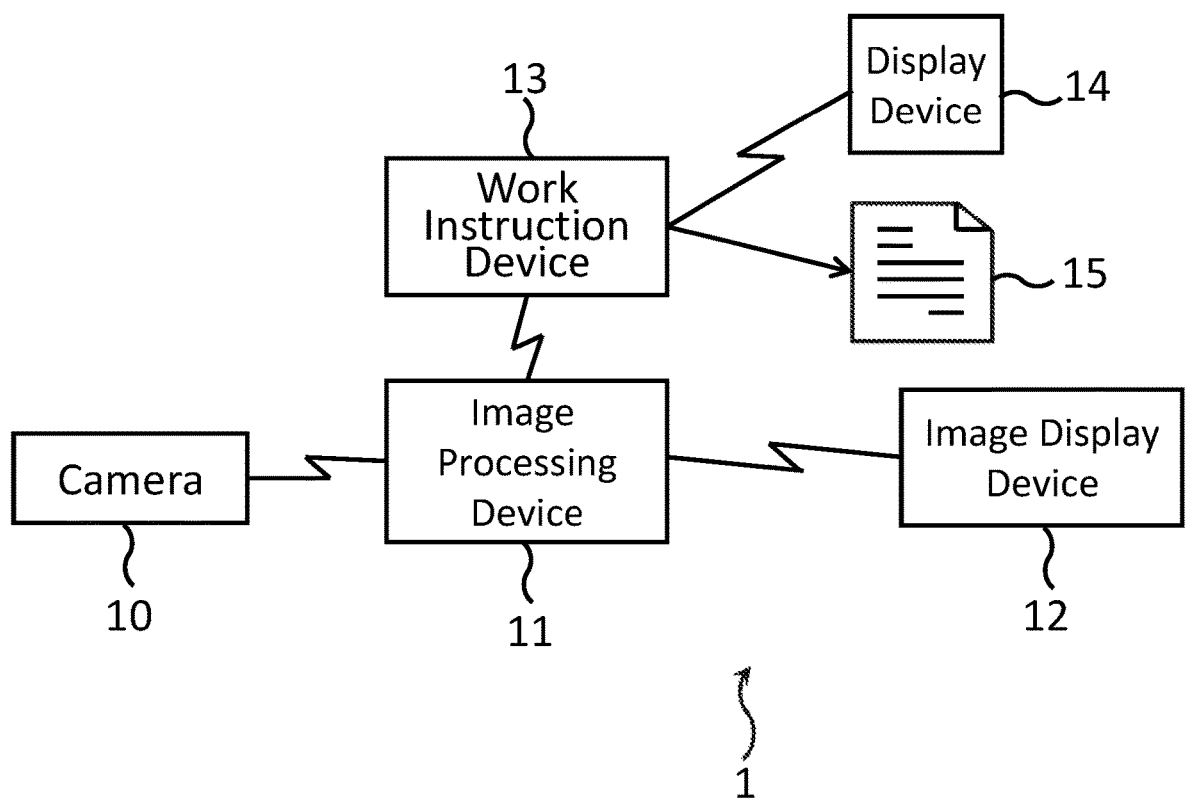
FIG. 1 is a diagram schematically illustrating an image processing system according to an embodiment.

First, a configuration of an image processing system 1 according to an embodiment will be described. FIG. 1 is a diagram illustrating the image processing system 1 according to an embodiment. As illustrated in FIG. 1, the image processing system 1 includes a camera 10, an image processing device 11, an image display device 12, a work instruction device 13, a display device 14, and the like.

The camera 10 captures a plurality of images or a video of a work area (hereinafter simply referred to as "video"). The camera 10 is installed so as to be able to capture the surroundings in which the worker performs his or her work in the work area. For example, the camera 10 is installed so as to capture video of a worker who is taking out a designated article and moving it to a designated position. The camera 10 may capture video of the entire work area by itself or in cooperation with a plurality of other cameras.

The image processing device 11 processes video or images (e.g., frames) captured by the camera 10. The image processing device 11 detects inappropriate work in the video captured by the camera 10. The image processing device detects the inappropriate work while storing the video captured by the camera 10. The image processing device 11 detects performed work that differs from the instructed work (work instructions) based on the video captured by the camera 10. Work that differs from the work instructions is considered to be inappropriate (erroneous) work. The image processing device 11 then extracts a video depicting the work determined as inappropriate work from the video acquired from the camera 10. Furthermore, the image processing device 11 also generates a notification video in which information indicating the aspects of the erroneous work that have been determined to be inappropriate is superimposed on the video of the work.

The image display device 12 displays the notification video supplied from the image processing device 11. The image display device 12 can be installed so that a worker who is performing the work or an observer who monitors the work can view the notification video. The image display device 12 displays the notification video generated by the image processing device 11. The image display device 12 may be provided with a speaker for outputting an alarm sound when inappropriate work is detected and the notification video is to be played.

The work instruction device 13 outputs work instruction information indicating the work to be performed by a worker. For example, the work instruction device 13 generates work instruction information (work instructions) for the work to be performed. The work instructions can be generated based on product delivery or order information that has been acquired from a system such as a delivery management system or an order management system. The work instruction device 13 displays the work instruction information on a display device 14 which can be viewed by the worker who is to perform the instructed work. For example, the display device 14 is installed at a position that is easily viewed by the worker during normal work performance. In some examples, the display device 14 may be provided in a portable terminal device carried by the worker or that can be held by the worker.

The work instruction device 13 may issue a work instruction sheet 15 on which work instruction information is printed. For example, the work instruction device 13 issues the work instruction sheet by causing a printer to print the work instruction information on a sheet of paper. In some examples, the work instruction device 13 may transmit the work instruction information to a management device that manages issuance of the work instruction sheet 15, and the management device may issue the work instruction sheet 15.

Figure 2:
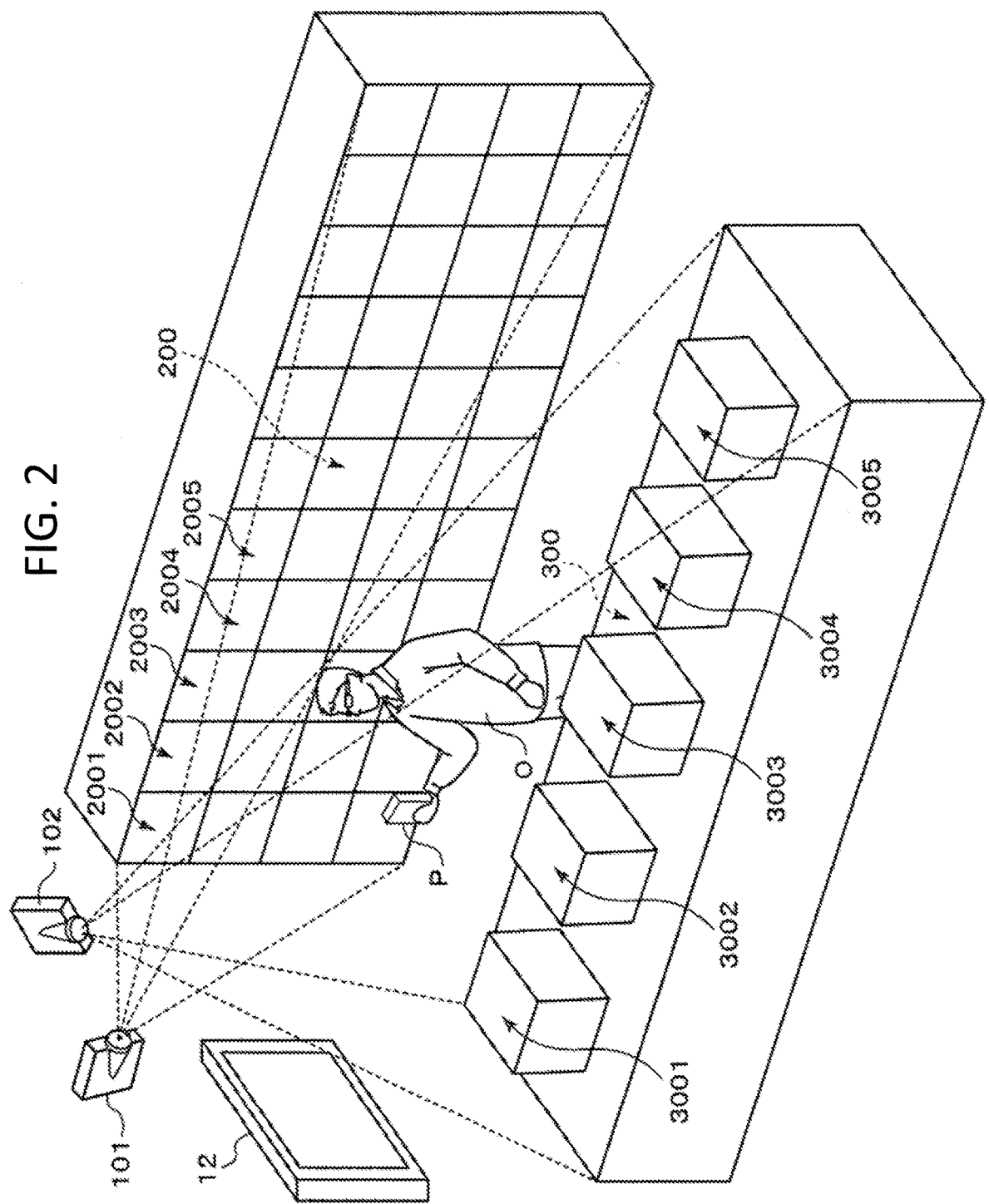
FIG. 2 is a diagram for explaining a work area to which an image processing system according to an embodiment is applied.

Next, a work area and the work to be monitored by the image processing system 1 will be described. FIG. 2 is a diagram for explaining a work area to be monitored by the image processing system 1. As shown in FIG. 2, the work area includes a picking area 200 and a sorting area 300. The picking area 200 is an area from a worker takes out a commodity or product from a storage location. This work type is referred to as "pickup work". In the picking area 200, commodities or products which are to be picked up are arranged. For example, a shelf on which the commodities are placed is installed in the picking area 200. In the picking area 200, in general, each commodity type is placed at a predetermined position. In the picking area 200, particular positions 2001, 2002, 2003, 2004, 2005, etc. (hereinafter referred to as "pickup positions") are specified as storage location from which the worker O can pick up the designated commodities or the like. Items that are picked from the particular positions of the picking area 200 can be referred to as "picked" or "taken-out" items.

The sorting area 300 is an area for a worker to perform sorting type work ("sorting work") such as putting a picked item into a storage container, such as a box, a cart, or the like. For example, in the sorting area 300, a delivery box containing a commodity to a delivery destination. The boxes arranged in the sorting area 300 may be conveyed by a conveyor or the like. In addition, the sort work may be a work in which a worker puts a designated commodity arranged in the picking area into a cart while moving the cart. In such a case, the sorting area 300 is an area in which the worker puts a commodity into the cart.

The storage containers in the sorting area 300 are individually identified by delivery destinations or the like. The storage containers are individually identified in the video captured by the camera 10. In the sorting area 300, particular positions ("packing positions") 3001, 3002, 3003, 3004, 3005, etc. are provided) at which the worker O puts the commodity P into a designated storage container at the particular packing position.

As shown in FIG. 2, the cameras 10 (101, 102) are provided to capture a video of the picking area 200 and the sorting area 300. In the example shown in FIG. 2, the camera 101 is installed to capture a video of the picking area 200, and the camera 102 is installed to capture a video of the sorting area 300. FIG. 2 shows an example in which the camera 10 includes two cameras 101 and 102. However, a single camera or three or more cameras may be used to capture the video of the picking area 200 and the sorting area 300.

In the example illustrated in FIG. 2, the image display device 12 is installed at a position that can be visually recognized by the worker O. The image display device 12 displays the video supplied from the image processing device 11. As described above, the image processing device 11 extracts the video captured by the camera 101 or 102 in the period in which an inappropriate work has been performed. The image processing device 11 generates a notification video in which information indicating the work determined to be inappropriate is superimposed on the video of the inappropriate work. The image display device 12 displays the notification video generated by the image processing device 11.

Figure 3:
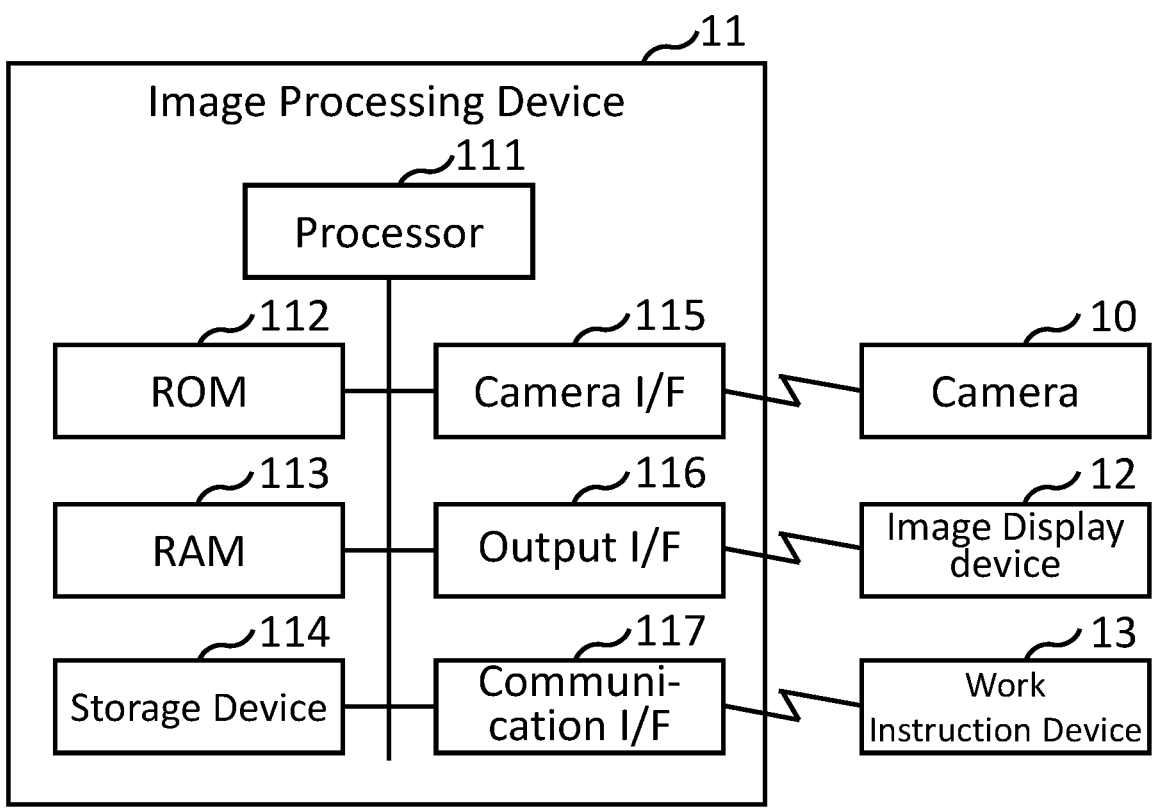
FIG. 3 is a block diagram illustrating an image processing device according to an embodiment.

Next, a configuration of the image processing device in the image processing system 1 according to an embodiment will be described. FIG. 3 is a block diagram illustrating the image processing device 11 in the image processing system 1. As shown in FIG. 3, the image processing device 11 includes a processor 111, a read-only memory (ROM) 112, a random access memory (RAM) 113, a storage device 114, a camera interface (I/F) 115, an output interface (I/F) 116, and a communication or network interface (I/F) 117.

The processor 111 performs various processes by executing a program. The processor 111 executes a program (a system program, an application program, or firmware) stored in the ROM 112 or the storage device 114. The processor 111 is, for example, a central processing unit (CPU), a microprocessing unit (MPU), or a digital signal processor (DSP). The processor 111 may be a combination of a plurality of CPUs, MPUs, DSPs, or the like.

The ROM 112 is a non-volatile memory. The ROM 112 stores one or more programs executed by the processor 111. The ROM 112 stores various setting values used by the processor 111 to perform various processes. The RAM 113 is a memory used for reading and writing programs and data. For example, the RAM 113 is used as a working memory for temporarily storing various types of programs executed by the processor 111.

The storage device 114 is a rewritable nonvolatile memory. The storage device 114 stores various programs and data. The storage device 114 may store one or more programs executed by the processor 111 or one or more setting values. In addition, the storage device 114 is a memory that stores images and videos captured by the camera 10. For example, the storage device 114 stores videos captured by the camera 10 at a predetermined frame rate together with time information. The processor 111 can read a specific part of a video captured at a designated time from the storage device 114.

The camera interface 115 is an interface for acquiring a video captured by the camera 10. For example, the camera interface 115 may be a network interface that is connected to a plurality of cameras 10 via a network. The camera interface 115 may be a serial interface that is connected to the camera 10.

The output interface 116 is an interface for communicating with the image display device 12. The output interface 116 may be any interface that supplies video data to be displayed on the image display device 12. For example, the output interface 116 may be a network interface that communicates with the image display device 12 via a network. The output interface 116 may be a serial interface connected to the image display device 12.

The communication interface 117 is an interface for communicating with the work instruction device 13. The communication interface 117 is an interface that acquires work instruction information. For example, the communication interface 117 is a network interface that communicates with the work instruction device 13 via a network. The communication interface 117 may be a serial interface that is connected to the work instruction device 13.

The communication interface 117 may be an input interface that acquires the work instruction, and is not limited to an interface that communicates with the work instruction device 13. For example, the communication interface 117 may acquire the work instruction information from a management device that manages information printed on the work instruction sheet 15, instead of the work instruction device 13. The communication interface 117 may be replaced with a device that reads the work instruction information from an image obtained by reading the work instruction sheet 15 on which the work to be performed is described.

Figure 4:
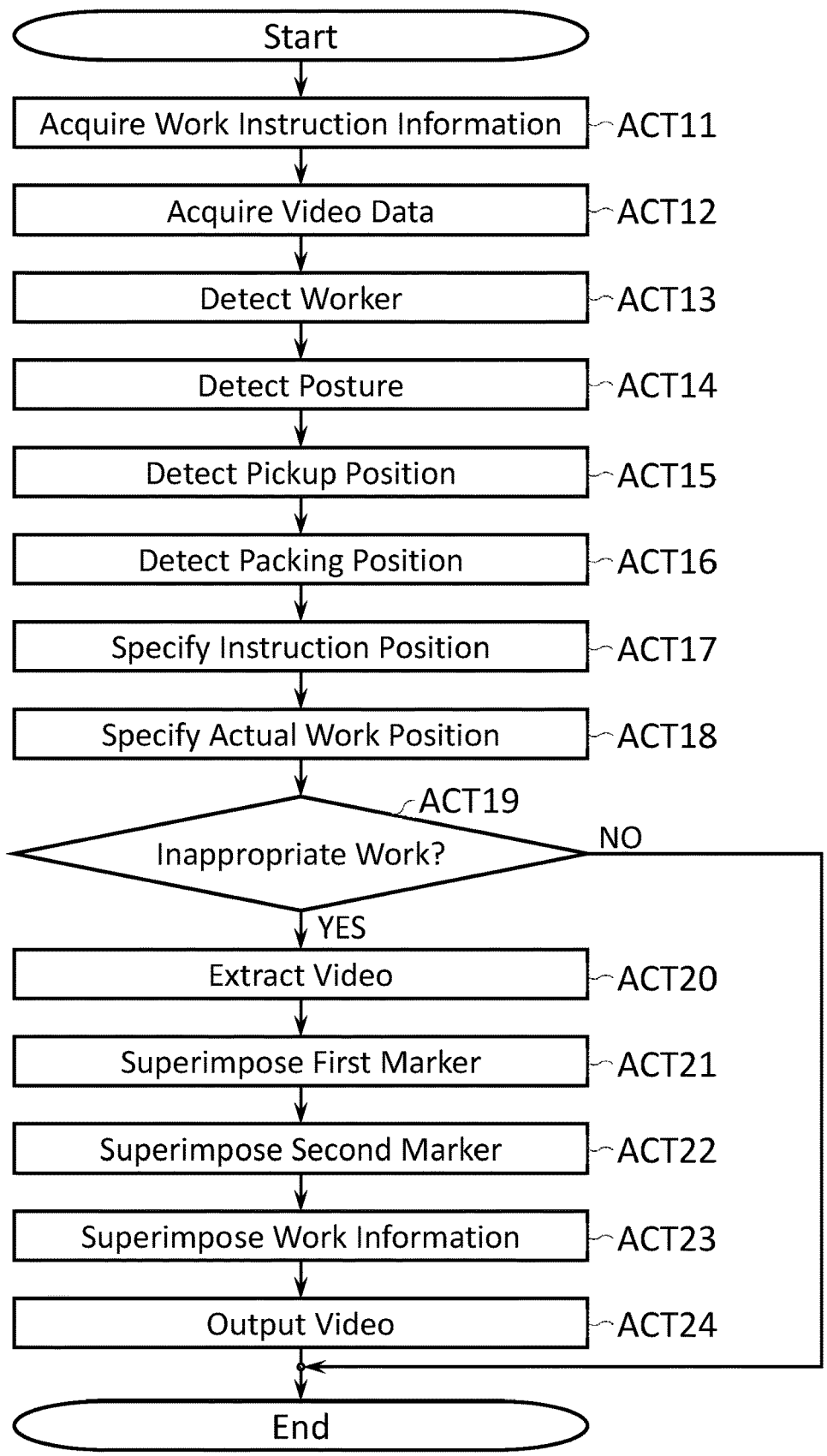
FIG. 4 is a flowchart of an operation performed by an image processing device according to an embodiment.

Next, an operation performed by the image processing device 11 in the image processing system 1 according to an embodiment will be described. FIG. 4 is a flowchart of the operation executed by the image processing device 11 in the image processing system 1. In the work area, a worker recognizes a work to be performed from work instruction information displayed on the display device 14 or the work instruction sheet 15 on which the work is described. The work instruction information is information indicating a work to be performed by the worker. The work instruction information displayed on the display device 14 or the work instruction information printed on the work instruction sheet 15 is output from the work instruction device 13. Here, it is assumed that the work instruction device 13 also supplies the work instruction information to the image processing device 11.

The image processing device 11 acquires the work instruction information from the work instruction device 13 through the communication interface 117 (ACT11). The processor 111 of the image processing device 11 stores the work instruction information acquired by the communication interface 117 in the RAM 113 or the storage device 114.

The camera 10 captures a video of a work area including a picking area 200 and a sorting area 300 in which the worker performs the instructed work. The camera 10 transmits video data of the captured video to the image processing device 11. The image processing device 11 acquires the video data supplied from the camera 10 through the camera interface 115 (ACT12). The processor 111 buffers the video data obtained by the camera interface 115 in the RAM 113, and then stores the buffered video data in the storage device 114.

When the video captured by the camera 10 is acquired, the processor 111 detects the worker in the acquired video (ACT13). Upon detecting the worker in the video, the processor 111 detects the position and posture of the worker in the acquired video (ACT14). For example, the processor 111 detects the position of the worker in the work area from the imaging direction of the camera 10 and the position of the worker in the captured video.

The processor 111 detects the posture of the worker from the video. For example, the processor 111 detects the posture of the worker using a posture estimation technique such as Open Pose. The posture of the worker is detected to determine whether the worker is performing a work of taking out a commodity or performing a work of packing a commodity. It is assumed that the worker moves a commodity held by hand to perform a pickup work or sorting work. Therefore, the processor 111 estimates the position of the hand or the movement of the hand of the worker as the posture of the worker.

In addition, the processor 111 detects a pickup position (i.e., take-out position) of each commodity in the picking area in the video acquired from the camera 10 (ACT15). For example, the processor 111 detects a part of the acquired video showing the pinking area. When the video of the picking area is detected, the processor 111 detects a pickup position of each commodity in the video of the picking area. For example, the processor 111 detects the pickup position of each commodity in the video of the picking area by using an object detection technology such as a Single Shot Multibox Detector ("SSD" or single shot detection).

In addition, the processor 111 detects the packing position of the commodity (i.e., a position where the worker puts the commodity into the designated storage container) in the sorting area 300 in the acquired video (ACT16). For example, the processor 111 detects a part of the acquired video showing the sorting area 300. After detecting the video of the sorting area 300, the processor 111 detects a packing position of each commodity in the video of the sorting area 300. For example, the processor 111 detects a storage container (for example, a box or a cart) in the sorting area 300 by using an object detection technology such as SSD, and detects an opening of the storage container as a commodity packing position.

The processor 111 may determine whether the worker is performing pickup work or sorting work based on the posture of the worker or the like. In some examples, when it is determined that the worker is performing pickup work, the processor 111 may omit the process of detecting the packing positions the sorting area 300. When it is determined that the worker is performing sorting work, the processor 111 may omit the process of detecting the pickup positions in the picking area 200.

After the pickup position of the commodity and the packing position of the commodity in the video are detected, the processor 111 identifies positions (an "instructed positions") corresponding to the work instruction information (ACT17). More particular, in this example, processor 111 identifies in the acquired video the pickup position and packing position for the commodity that the work instruction information designates as a work target as instructed positions. For example, the processor 111 specifies a pickup position for the commodity designated by the work instruction information as an instructed position by identifying the designated pickup position among the different pickup positions detected in the video. The processor 111 specifies a packing position for the commodity designated by the work instruction information as an instructed position by identifying the designated packing position among the different packing positions detected in the video.

In addition, the processor 111 identifies the positions ("actual work positions") in the video at which the worker actually picked or packed the commodity (ACT18). For example, based on the position and the posture of the worker, the processor 111 specifies the pickup position from which an item was actually removed by the worker and the packing position in which the item was placed by the worker as actual work positions.

After the instructed position the actual work position are specified, the processor 111 then determines whether the work performed by the worker was inappropriate from the relationship between the instructed position and the actual work position (ACT19). When the instructed position and the actual work position match, the processor 111 determines that the work performed by the worker was appropriate (ACT19, NO). When the instructed position and the actual work position do not match, the processor 111 determines that the work performed by the worker was inappropriate (ACT19, YES).

When it is determined that the work was inappropriate (ACT19, YES), the processor 111 extracts a video corresponding to a period in which the work determined as inappropriate work was performed (ACT20). The processor 111 identifies a time at which the work determined as inappropriate was started (hereinafter referred to as "start time of the inappropriate work"). Once the start time of the inappropriate work is specified, the processor 111 extracts the video stored in the storage device 114 for the start time of the inappropriate work as a starting point.

When the video of the inappropriate work is extracted, the processor 111 superimposes an image of a first marker at the instructed position in the video (ACT21). When the image of the first marker is superimposed, the processor 111 further superimposes an image of a second marker at the actual work position in the video (ACT22).

When the first and second markers are superimposed, the processor 111 further superimposes information indicating the instructed work on the video (ACT23). The information indicating the instructed work can be information identifying the particular aspects of the work that have bene determined to be inappropriate or may be information indicating the work corresponding to the work instruction information. For example, the information indicating the work is superimposed as text on the video.

The processor 111 outputs the video on which the first and second markers and the information indicating the instructed work are superimposed, to the image display device 12. (ACT24). This video with the markers and information superimposed thereon can be referred to as a notification video that is used for notifying of inappropriate work. The processor 111 causes the image display device 12 to display the notification video by supplying the notification video to the image display device 12.

Figure 5:
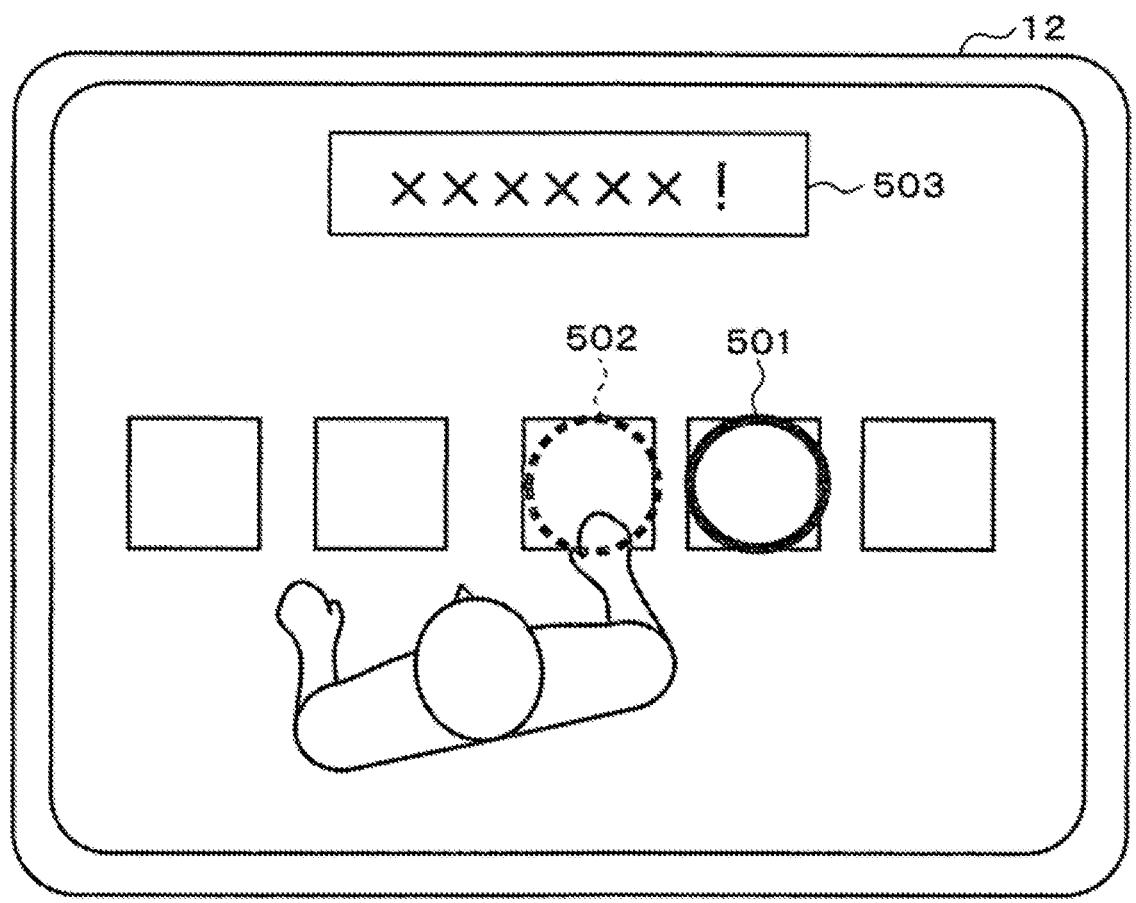
FIG. 5 is a diagram illustrating a notification video displayed by an image processing device according to an embodiment.

FIG. 5 is a diagram showing a notification video displayed on the image display device 12 by the image processing device 11. As shown in FIG. 5, the image display device 12 displays the notification video on which a first marker 501, a second marker 504, and information 503 indicating an instructed work are superimposed. The image display device 12 displays the video from beginning at the start time for the work determined to be inappropriate. The first marker 501 indicates an instructed position indicated as a work target by the work instruction information. The second marker 502 indicates an actual work position indicating a position where the worker has performed work. In addition, the information 503 indicates the work determined to be inappropriate or the work indicated by the work instruction information that should be performed by characters or the like.

According to the display example illustrated in FIG. 5, the image display device 12 displays the first marker 501 and the second marker 502 at different positions in the video of the inappropriate work. As a result, in the image processing system 1, it is possible to notify that the work has been performed at a position different from the designated position in an intuitively understandable manner. According to the display example illustrated in FIG. 5, the image display device 12 displays the information 503 indicating the instructed work in the video of the inappropriate work. As a result, in the image processing system 1, it is possible to notify the user of the information on the work determined to be inappropriate by characters or the like.

In the operation examples described above, the image processing device 11 detects the pickup position and the packing position for each commodity in the video by video analysis. However, the image processing device 11 may detect the pickup position and the packing position for each commodity in the video by any other known methods.

For example, if the pickup position for each commodity is fixed, the camera 10 having a fixed photographing range always captures the pickup position for each commodity at the same position. In such a case, the storage device 114 can store in advance information indicating the pickup position for the commodity in the video captured by the camera 10. The pickup position for the commodity designated by the work instruction information can be specified as a designated position based on the information stored in the storage device 114.

Similarly, if the position of the packing position for each commodity is fixed, a camera 10 with a fixed photographing range can be positioned to always photograph the packing position for each commodity. In such a case, the storage device 114 may pre-store information indicating the packing positions in the video captured by the camera 10 for commodities. The packing position for the commodity designated by the work instruction information can be specified as a designated position based on the information stored in the storage device 114.

In some examples, the actual work positions can be identified based on a detection result of a sensor (for example, a proximity sensor) that detects a worker at the pickup position for each commodity and similarly for the packing position for each commodity. For example, the processor 111 identifies, as an actual work position, the pickup position or the packing position for the commodity at which the worker is detected by the sensor. If the pickup positions and the packing positions are at fixed locations, the storage device 114 can store information indicating the different pickup positions and the packing positions. In such a case, the processor 111 can identify particular the pickup position or the packing position for the actual work positions in the video from the information stored in the storage device 114.

According to the aforementioned embodiments, the image processing device records, in the memory, a video captured by the camera in a work area. The image processing device identifies in the video an instructed position for a target item to be processed by a worker. The image processing device also identifies the actual work positions (pickup location and packed location) in the video for the target item. The image processing device can thus identify inappropriate work when a designated (instructed) position and an actual work position do not match. The image processing device can then extract the video recorded in the memory with the start time for the work determined as inappropriate as a starting point. The image processing device can then display the extracted video on the image display device.

Through the above-described process, the image processing device can display, on an image display device, a video of the worker performing the work inappropriately. As a result, the worker or the supervisor/observer can immediately check the inappropriate work in the captured video.

The image processing device additionally superimposes a first marker on the instructed position and a second marker on the actual work position in the extracted video of the inappropriate work. The image processing device then causes the image display device to display video including the superimposed first and second markers. Accordingly, the image processing device can display, on the image display device, a video indicating the instructed position and the actual work position. As a result, the worker or the supervisor can easily recognize the work that has been determined to be inappropriate.

The image processing device includes an interface that acquires work instruction information. The image processing device displays details of the work instructions for the work determined as inappropriate together with the video thereof. Accordingly, the image processing device can display the work instructions for the work determined as inappropriate on the image display device together with the video showing the inappropriate work that was performed.

As a result, the worker or the supervisor can accurately compare the instructed work to the actual work that has been determined to be inappropriate.

In the above-described embodiments, the program(s) executed by the processor can be stored in advance in the memory in the device. However, in other examples, the program(s) executed by the processor may be downloaded to the device via a network or may be installed in the device from a non-transitory storage medium. The storage medium may be any storage medium that can store the program(s) and that can be read by the device. The functions that can be performed by the installation or download may be performed in cooperation with an OS (operating system) or the like in the device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing device, comprising:
    a camera interface connectable to a camera;
    an output interface connectable to a display device;
    a memory that stores task information about a task to be performed; and
    a processor configured to:
        determine a position and a posture of a worker in a video captured by the camera,
        determine whether the worker has performed the task properly based on a comparison of the determined position and posture with the task information stored in the memory,
        upon determining that the worker has not performed the task properly, extract from the captured video a first video showing the worker who is performing the task, and
        control the display device to display the first video.

2. The image processing device according to claim 1, wherein the processor is further configured to:
    based on the task information, determine a first position at which the task is to be performed by the worker and a first posture to be taken by the worker at the first position,
    determine whether the worker has taken the first posture at the first position based on the position and the posture of the worker that have been determined from the captured video,
    upon determining that the worker has taken the first posture at the first position, determine that the worker has performed the task properly, and
    upon determining that the worker has not taken the first posture at the first position, determine that the worker has not performed the task properly.

3. The image processing device according to claim 2, wherein when the worker has not performed the task properly, the processor controls the display device to display the first video such that each of the position of the worker that has been determined from the captured video and the first position at which the task is to be performed by the worker is indicated by a different marker.

4. The image processing device according to claim 3, further comprising:
    an input interface connectable to an input device, wherein the task information is input via the input device.

5. The image processing device according to claim 3, wherein the task information is displayed as text together with the marker.

6. The image processing device according to claim 2, wherein the task is to take a commodity from a shelf or pack the commodity into a container, and the first position at which the task is to be performed by the worker is a position at which the commodity is taken from the shelf or a position at which the commodity is packed into the container.

7. The image processing device according to claim 6, wherein the first posture is a posture taken by the worker to take the commodity from the shelf or a posture taken by the worker to pack the commodity into the container.

8. The image processing device according to claim 6, wherein the camera is arranged to capture the video of a work area where the worker moves to take and pack the commodity.

9. The image processing device according to claim 1, further comprising:
    a network interface configured to communicate with an external device, wherein the task information is received from the external device.

10. The image processing device according to claim 1, wherein a sound is output when the first video is displayed on the display device.

11. A method carried out by an image processing device, the method comprising:
    storing task information in a memory;
    capturing a video of a worker in a work area;
    determining a position and a posture of the worker in the captured video;
    determining whether the worker has performed the task properly based on the task information and the determined position and posture of the worker;
    upon determining that the worker has not performed the task properly, extracting from the captured video a first video showing the worker who is performing the task; and
    displaying the first video on a display device.

12. The method according to claim 11, further comprising:
    reading the task information and determining a first position at which the task is to be performed by the worker and a first posture to be taken by the worker at the first position;
    determining whether the worker has taken the first posture at the first position based on the position and the posture of the worker that have been determined from the captured video;
    upon determining that the worker has taken the first posture at the first position, determining that the worker has performed the task properly; and
    upon determining that the worker has not taken the first posture at the first position, determining that the worker has not performed the task properly.

13. The method according to claim 12, wherein the first video is displayed such that each of the position of the worker that has been determined from the captured video and the first position at which the task is to be performed by the worker is indicated by a different marker.

14. The method according to claim 13, further comprising:

receiving the task information that has been input via an input device.

15. The method according to claim 13, wherein the task information is displayed as text together with the marker.

16. The method according to claim 12, wherein the task is to take a commodity from a shelf or pack the commodity into a container, and the first position at which the task is to be performed by the worker is a position at which the commodity is taken from the shelf or a position at which the commodity is packed into the container.

17. The method according to claim 16, wherein the first posture is a posture taken by the worker to take the commodity from the shelf or a posture taken by the worker to pack the commodity into the container.

18. The method according to claim 16, wherein the work area is an area where the worker moves to take and pack the commodity.

19. The method according to claim 11, further comprising:

receiving the task information from an external device.

20. An image processing system, comprising:

a camera;
a display device;
a memory that stores task information about a task to be performed; and
a processor configured to:
  determine a position and a posture of a worker in a video captured by the camera,
  determine whether the worker has performed the task properly based on the task information stored in the memory and the determined position and posture of the worker,
  upon determining that the worker has not performed the task properly, extract from the captured video a first video showing the worker who is performing the task, and
  control the display device to display the first video.

* * * * *